United States Patent
Charlebois et al.

(10) Patent No.: US 7,873,923 B2
(45) Date of Patent: Jan. 18, 2011

(54) POWER GATING LOGIC CONES

(75) Inventors: Steven E. Charlebois, Jericho, VT (US);
Paul D. Kartschoke, Williston, VT (US); John J. Reilly, Huntington, VT (US); Manikandan Viswanath, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/038,845

(22) Filed: Feb. 28, 2008

(65) Prior Publication Data

US 2009/0222772 A1    Sep. 3, 2009

(51) Int. Cl.
G06F 17/50    (2006.01)
G06F 9/45    (2006.01)

(52) U.S. Cl. .............. 716/2; 716/1; 716/3; 716/4; 716/5; 716/6; 716/18; 703/13; 703/14

(58) Field of Classification Search .......... 716/1–6, 716/18; 703/13, 14
See application file for complete search history.

(56) References Cited

U.S. PATENT DOCUMENTS

| | | | |
|---|---|---|---|
| 5,880,604 | A | 3/1999 | Kawahara et al. |
| 6,345,379 | B1 * | 2/2002 | Khouja et al. .............. 716/4 |
| 6,687,883 | B2 | 2/2004 | Cohn et al. |
| 6,977,519 | B2 | 12/2005 | Bhavnagarwala et al. |
| 7,088,131 | B1 | 8/2006 | Stout et al. |
| 7,100,144 | B2 | 8/2006 | Jacobson et al. |
| 7,603,635 | B2 * | 10/2009 | Sotiriou et al. .............. 716/1 |
| 2004/0060016 | A1 * | 3/2004 | Patra et al. .............. 716/2 |
| 2006/0236278 | A1 * | 10/2006 | Shimony .............. 716/6 |
| 2009/0100385 | A1 * | 4/2009 | Baumgartner et al. .......... 716/2 |

OTHER PUBLICATIONS

Kim et al.; "Logic transformation for low power synthesis"; Publication Year: 1999; Design, Automation and Test in Europe Conference and Exhibition 1999. Proceedings, pp. 158-162.*

Sagahyroon et al.; "A VHDL-based simulation methodology for estimating switching activity in static CMOS circuits"; Publication Year: 1998; ASIC Conference 1998. Proceedings. Eleventh Annual IEEE International; pp. 295-300.*

Sundaram et al.; "Logic simulation using T-algorithm on network of workstations"; Publication Year: 1994; TENCON '94. IEEE Region 10's Ninth Annual International Conference. Theme: Frontiers of Computer Technology; pp. 285-289 vol. 1.*

(Continued)

*Primary Examiner*—Helen Rossoshek
(74) *Attorney, Agent, or Firm*—David A. Cain; Hoffman Warnick LLC

(57) ABSTRACT

Power gating logic cones is described. In one embodiment a method includes synthesizing logic for an integrated circuit (IC) design; identifying low switching nodes within the logic that switch less than a threshold; determining a potential power gating cone (PGC) based on the identified low switching nodes; determining a power gating logic expression for the potential PGC that includes a minimum set of inputs to the potential PGC that are least switching; determining whether energy savings using the power gating logic expression meets a criteria; and accepting the potential PGC in response to meeting the criteria.

14 Claims, 5 Drawing Sheets

OTHER PUBLICATIONS

Czajkowski et al.; "Fast toggle rate computation for FPGA circuits"; Publication Year: 2008; Field Programmable Logic and Applications, 2008. FPL 2008. International Conference on; pp. 65-70.*

Chen et al.; "State encoding of finite state machines for low power design"; Publication Year: 1995; Circuits and Systems, 1995. ISCAS '95., 1995 IEEE International Symposium on ; vol. 3; pp. 2309-2312 vol. 3.*

* cited by examiner

| A | B | C | % | Z(A,B,C) = !ABC + A!B | P(A,B) = !AB + A!B | P(A,B) = !A + !B | P(A,B) = A + B | P(A,C) = A + C | P(B,C) = !B + C |
|---|---|---|---|---|---|---|---|---|---|
| 0 | 0 | 0 | 25% | 0 | 0 | 1 | 0 | 0 | 1 |
| 0 | 0 | 1 | 10% | 0 | 0 | 1 | 0 | 1 | 1 |
| 0 | 1 | 0 | 30% | 0 | 1 | 1 | 1 | 0 | 0 |
| 0 | 1 | 1 | 10% | 1 | 1 | 1 | 1 | 1 | 1 |
| 1 | 0 | 0 | 5% | 1 | 1 | 1 | 1 | 1 | 1 |
| 1 | 0 | 1 | 10% | 1 | 1 | 1 | 1 | 1 | 1 |
| 1 | 1 | 0 | 0% | 0 | 0 | 0 | 1 | 1 | 0 |
| 1 | 1 | 1 | 10% | 0 | 0 | 0 | 1 | 1 | 1 |
|   |   |   | 100% | 25% | 55% | 90% | 65% | 45% | 70% |

FIG. 5

POWER GATING LOGIC CONES

BACKGROUND

1. Technical Field

The disclosure relates generally to integrated circuit (IC) design and, more particularly, to power gating logic cones.

2. Background Art

During integrated circuit (IC) operation, not all logic cones (i.e., sets of circuitry), within an IC are always powered up. For example, some logic cones may not be used for certain tasks and thus may be powered down to save energy and to make the IC perform better. Whenever a particular logic cone is powered up, there is almost always some sort of power dissipation occurring in other logic cones within the same voltage island. The power dissipation is a concern especially due to power density issues. Hence, it is advantageous to reduce power and, specifically, to reduce leakage power by power gating a logic cone. Power gating is the action of selecting a piece (cone) of logic, turning off the voltage to the logic gates of the logic cone to effectively save power, and fencing the logic cone output(s) so that when the logic cone is not powered the output(s) goes to a known state. The fencing of the logic cone output(s) prevents logic faults in other downstream logic cones. Current approaches of power gating typically use a manual process in selecting the logic cones to be power gated and a manual process to create the logic that controls the voltage island. The typical power gating is usually done in a high-level description language (HDL, VHDL or Verilog). This technique, however, leaves many non-power gated logic cones unnecessarily leaking power. Hence, it is desirable to automatically power gate logic cones and to maximize the amount of logic cones power gated to minimize leakage and save energy.

BRIEF SUMMARY OF THE INVENTION

Power gating logic cones is described. In one embodiment a method includes synthesizing logic for an integrated circuit (IC) design; identifying low switching nodes within the logic that switch less than a threshold; determining a potential power gating cone (PGC) based on the identified low switching nodes; determining a power gating logic expression for the potential PGC that includes a minimum set of inputs to the potential PGC that are least switching; determining whether energy savings using the power gating logic expression meets a criteria; and accepting the potential PGC in response to meeting the criteria.

A first aspect of the disclosure provides a method comprising: synthesizing logic for an integrated circuit (IC) design; identifying low switching nodes within the logic that switch less than a threshold; determining a potential power gating cone (PGC) based on the identified low switching nodes; determining a power gating logic expression for the potential PGC that includes a minimum set of inputs to the potential PGC that are least switching; determining whether energy savings using the power gating logic expression meets a criteria; and accepting the potential PGC in response to meeting the criteria.

A second aspect of the disclosure provides a system comprising: means for synthesizing logic for an integrated circuit (IC) design; means for identifying low switching nodes within the logic that switch less than a threshold; means for determining a potential power gating cone (PGC) based on the identified low switching nodes; means for determining a power gating logic expression for the potential PGC that includes a minimum set of inputs to the potential PGC that are least switching; means for determining whether energy savings using the power gating logic expression meets a criteria; and means for accepting the potential PGC in response to meeting the criteria.

A third aspect of the disclosure provides a program product stored on a computer-readable medium, which when executed, power gates logic cones, the program product comprising: program code for synthesizing logic for an integrated circuit (IC) design; program code for identifying low switching nodes within the logic that switch less than a threshold; program code for determining a potential power gating cone (PGC) based on the identified low switching nodes; program code for determining a power gating logic expression for the potential PGC that includes a minimum set of inputs to the potential PGC that are least switching; program code for determining whether energy savings using the power gating logic expression meets a criteria; and program code for accepting the potential PGC in response to meeting the criteria.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 shows a table of statistics for determining a power gating logic expression for a potential PGC.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
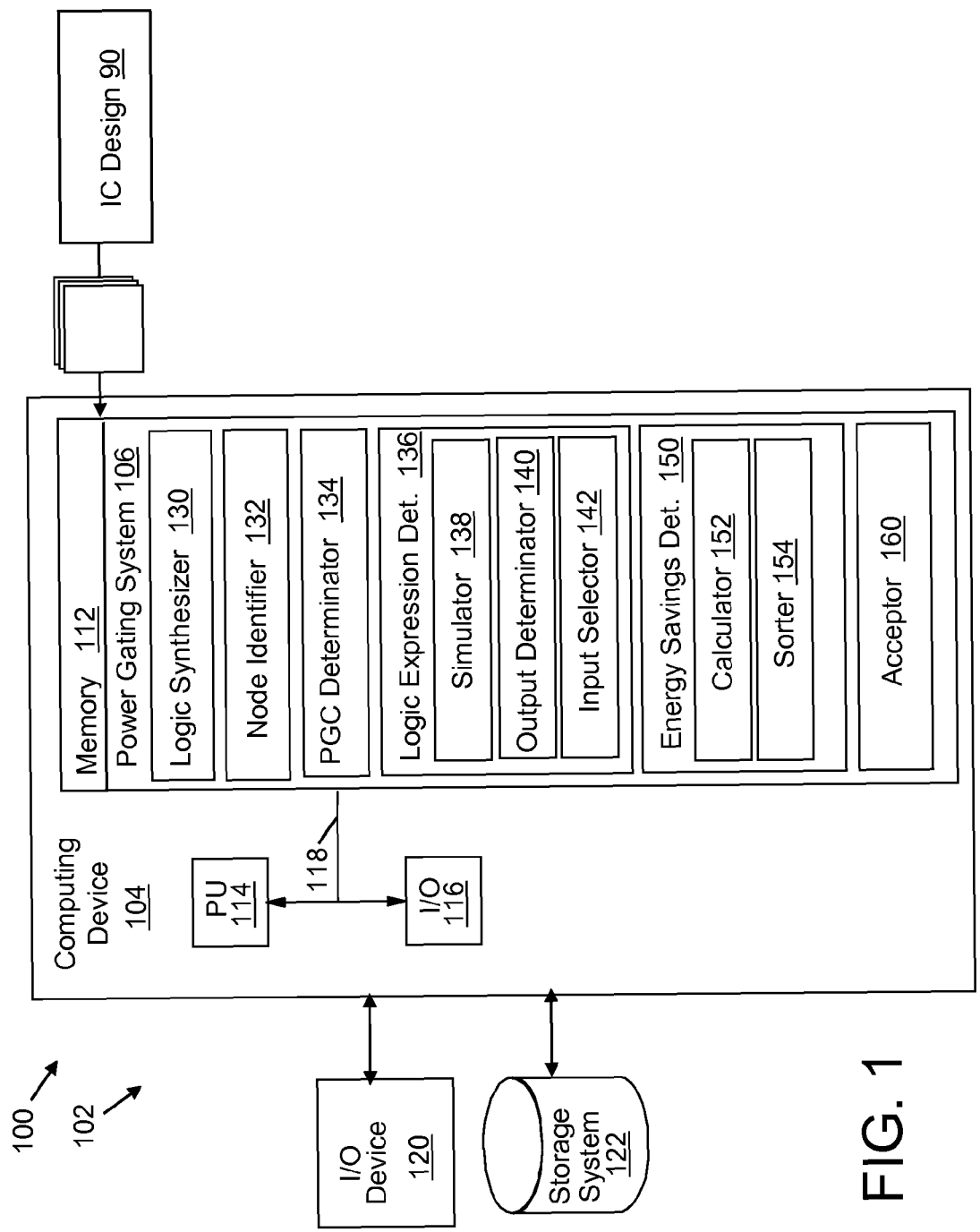
FIG. 1 shows a block diagram of a computer infrastructure for carrying out embodiments of the disclosure.
Figure 2:
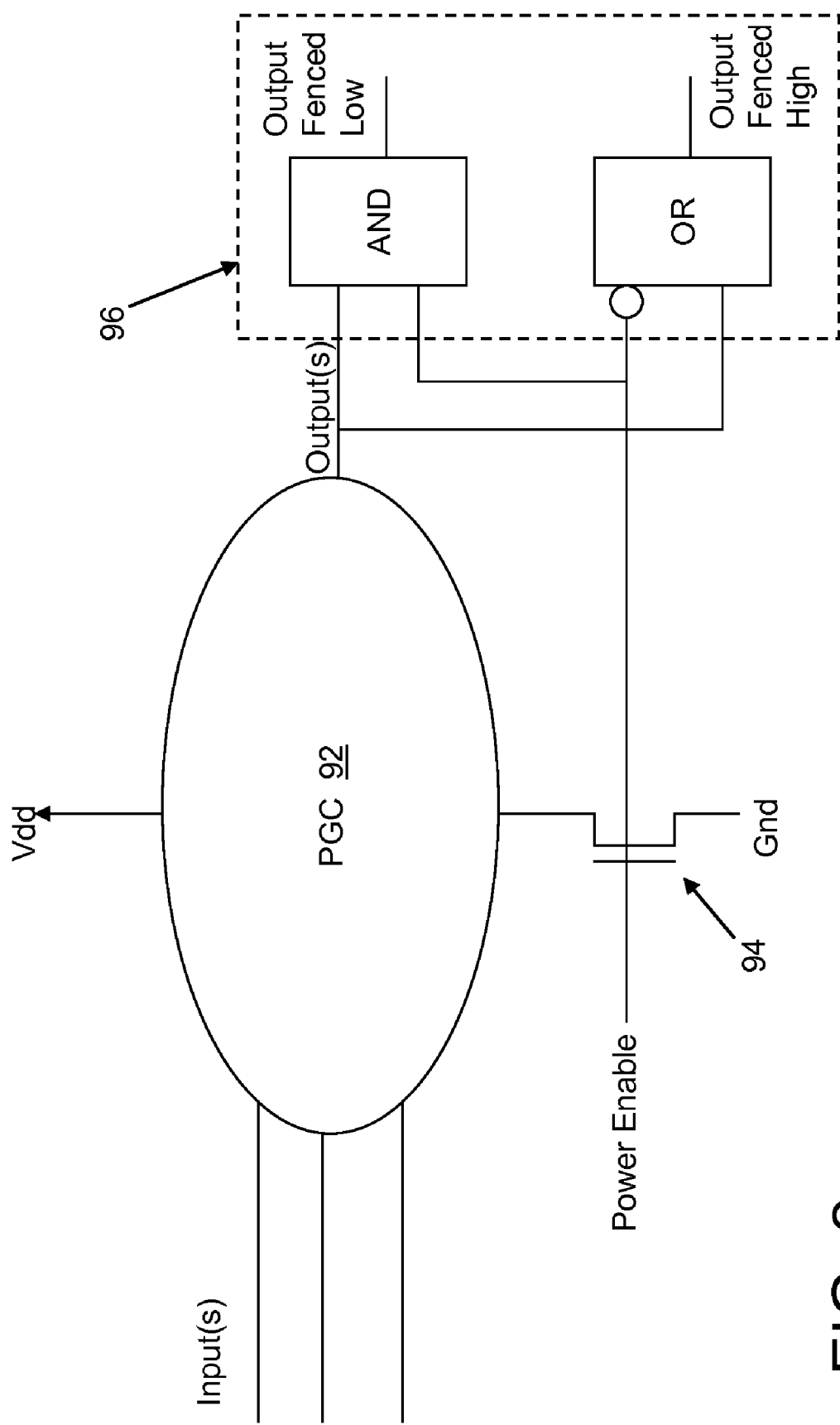
FIG. 2 shows an illustrative power gated cone.

Turning to the drawings, FIG. 1 shows an illustrative environment 100 for power gating logic cones within an integrated circuit (IC) design 90. IC design 90 may be obtained from another design system (not shown). Logic cones are sets of circuitry within IC design 90, which may be positioned within a given voltage island of IC design 90. IC design 90 may comprise an embodiment of an IC in the form of schematics or HDL, a hardware-description language (e.g., Verilog, VHDL, C, etc.), and may be contained on one or more machine readable medium. FIG. 2 shows a block diagram of a power gated cone (PGC) 92 within IC design 90. PGC 92 includes an input(s) (many shown) and an output(s) (only one shown). In order to power gate a logic cone, a power enable switch 94 is provided that turns power on or off to PGC 92 based on a power enable signal thereto. Power enable switch 94 also is linked to appropriate fencing logic 96 that fences the output(s) of PGC 92 to an appropriate state (high (1) or low (0)) so that the powering down of PGC 94 does not impact other downstream logic (not shown).

Returning to FIG. 1, environment 100 includes a computer infrastructure 102 that may perform the various process steps described herein for power gating logic cones of IC design 90. In particular, computer infrastructure 102 is shown including a computing device 104 that comprises a power gating system 106, which enables computing device 104 to power gate logic cones, i.e., modify IC design 90 for power gating of logic cones therein, by performing the process steps of the disclosure.

Computing device 104 is shown including a memory 112, a processor (PU) 114, an input/output (I/O) interface 116, and a bus 118. Further, computing device 104 is shown in communication with an external I/O device/resource 120 and a storage system 122. As is known in the art, in general, processor 114 executes computer program code, such as power gating system 106, that is stored in memory 112 and/or storage system 122. While executing computer program code, processor 114 can read and/or write data, such as power gating, to/from memory 112, storage system 122, and/or I/O interface 116. Bus 118 provides a communications link between each of the components in computing device 104. I/O device 120 can comprise any device that enables a user to interact with computing device 104 or any device that enables computing device 104 to communicate with one or more other computing devices. Input/output devices (including but not limited to keyboards, displays, pointing devices, etc.) can be coupled to the system either directly or through intervening I/O controllers.

In any event, computing device 104 can comprise any general purpose computing article of manufacture capable of executing computer program code installed by a user (e.g., a personal computer, server, handheld device, etc.). However, it is understood that computing device 104 and power gating system 106 are only representative of various possible equivalent computing devices that may perform the various process steps of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in one embodiment, computer infrastructure 102 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further below, power gating system 106 enables computing infrastructure 102 to power gating logic cones. To this extent, power gating system 106 is shown including a logic synthesizer 130, a node identifier 132, a power gating cone (PGC) determinator 134, a logic expression determinator (det.) 136 including a simulator 138, an output determinator 140 and an input selector 142, an energy savings determinator 150 including an energy calculator 152 and a sorter 154, and an acceptor 160. Operation of each of these systems is discussed further below. It is understood that some of the various systems shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 3:
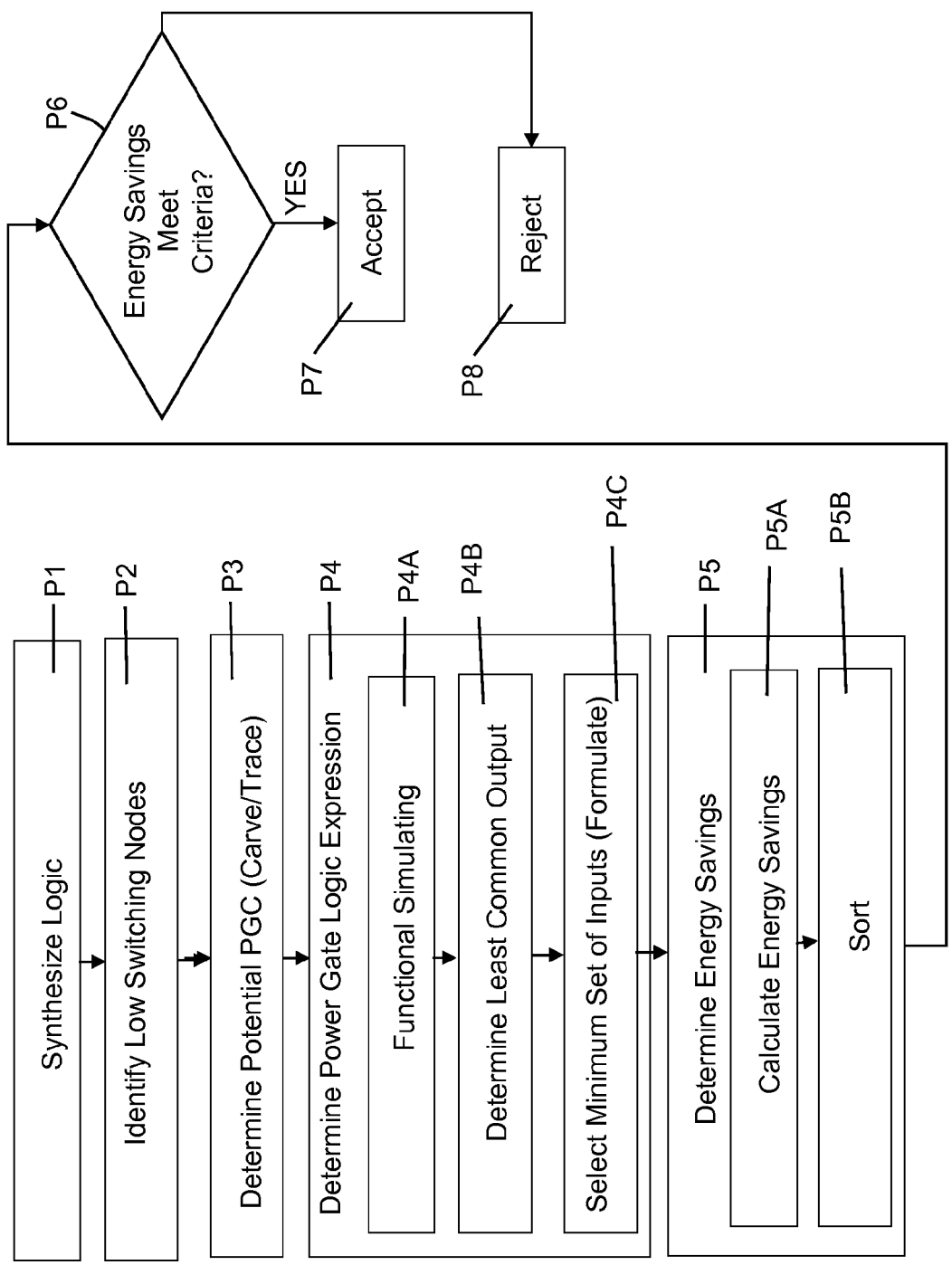
FIG. 3 shows a flow diagram of embodiments of a method according to the disclosure.

FIG. 3 shows a flow diagram of embodiment of an operational methodology of power gating system 106. In process P1, logic synthesizer 130 synthesizes logic for IC design 90. Logic synthesizer 130 may include any now known or later developed hardware/software package for forming a graphical representation of IC design 90, e.g., a netlist. For example, a Cadence design system or similar system.

In process P2, node identifier 132 identifies low switching nodes within the logic that switch less than a threshold. "Switching" indicates a change between states, i.e., 1 and 0. In particular, node identifier 132 runs a functional simulation of IC design 90 using a representative power benchmark on the detailed netlist. As understood, the functional simulation provides a detailed analysis of nodes within the logic of IC design 90 such that those nodes that switch the least compared to other nodes, i.e., low switching nodes, can be identified. The threshold required in order for a node to be considered a low switching node can be user defined, and may vary based on a number of factors, e.g., size of IC design 90, performance requirements, switching amount of other nodes, etc. In any event, logic that is coupled to a low switching node is a prime candidate to be power gated since the logic provides an output that does not switch often compared to other nodes. Hence, setting the output of the logic coupled to the low switching node to a known state does not impact other logic as much as those that switch more often.

Figure 4:
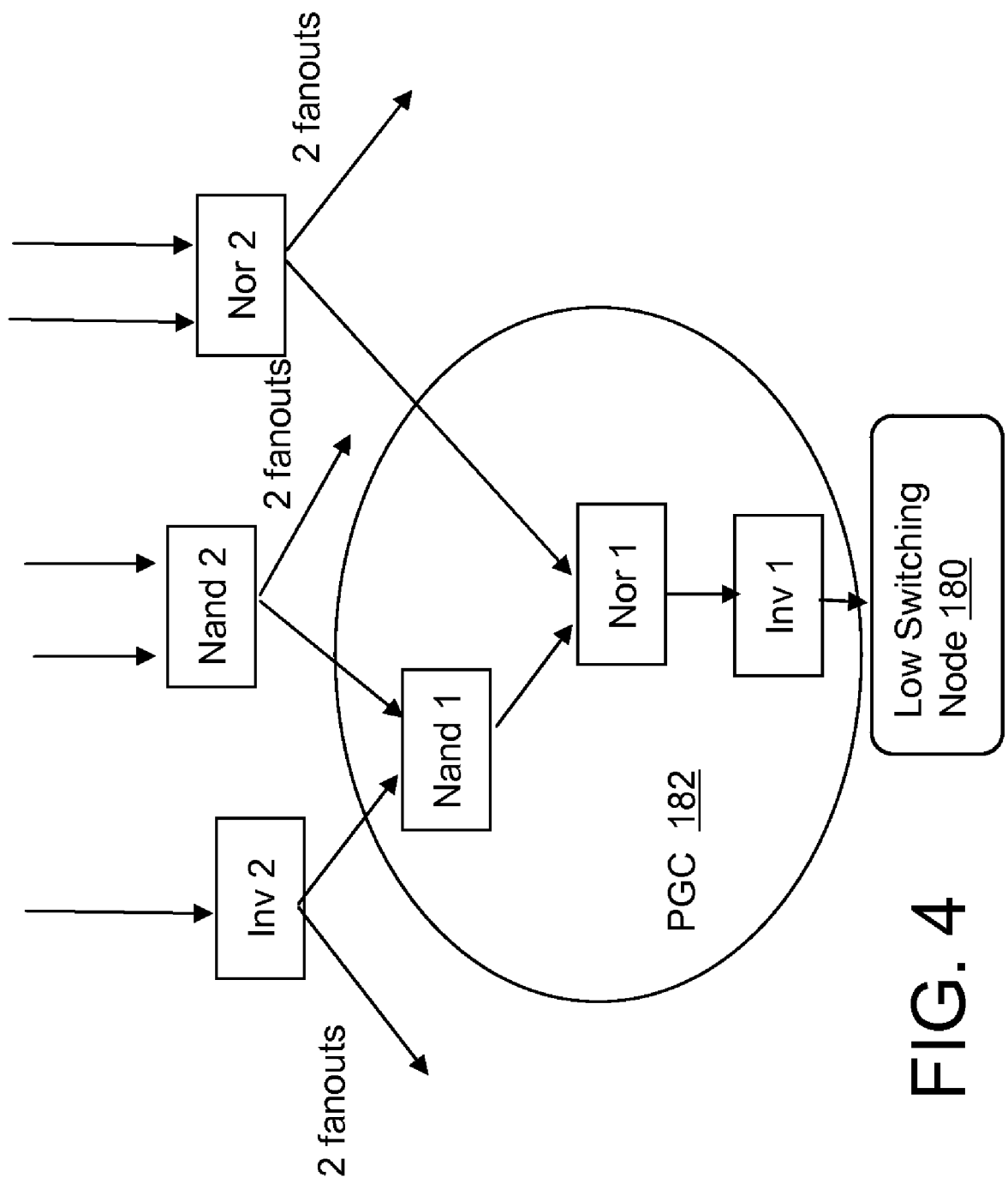
FIG. 4 shows a schematic for determining a potential power gating cone.

In process P3, PGC determinator 134 determines a potential power gating cone (PGC) based on the identified low switching nodes. A potential power gating cone refers to a selected piece (cone) of logic that may have the voltage turned off to the logic gates of the logic cone to effectively save power, and the logic cone output(s) fenced so that when the logic cone is not powered the output(s) goes to a known state. Referring to FIG. 4, PGC determinator 134 traces each low switching node backward and includes each logic gate (also known as macros) having only one fanout in the potential PGC for that low switching node. Fanout of a logic gate (e.g., NAND, NOR, INV, etc.) is the number of logic gates its output drives. For the FIG. 4 example, a low switching node 180 is driven by inverter 1 (Inv1). Inv1 becomes the starting point for tracing and is included in potential PGC 182. Trace back from Inv1 to Nor1. Nor1 has only one fanout so it is added to potential PGC 182. Trace back from Nor1 to Nand1 and Nor2. Nand1 has only one fanout and is added to potential PGC 182. Nor2 has more than one fanout so is not included. Trace back from Nand1 to Inv2 and Nand2. Both Inv2 and Nand2 have more than one fanout so both are not included. There are now no more logic gates to trace back from so PGC 182 has been defined. This process may be repeated for each low switching node 180. It is understood that while the present disclosure uses more than one fanout for a logic gate as a cut off for inclusion in a potential PGC 182, higher numbers of fanouts or other criteria entirely may be employed for determining which logic gates are included in a potential PGC.

In process P4, logic expression determinator 136 determines a power gating logic expression for the potential PGC 182 (FIG. 4) that includes a minimum set of inputs to the potential PGC that are least switching. In one embodiment, this process may include, as shown in process P4A, simulator 138 functionally simulating potential PGC 182 (FIG. 4). FIG. 5 shows a table of statistics resulting from the simulation. In process P4B, output determinator 140 determines a least common output value of potential PGC 182 (FIG. 3) based on the functional simulation. Referring to FIG. 5, column 190 shows outputs of potential PGC 182 (FIG. 4) based on all possible inputs A, B and C, which are shown in the farthest left columns. From the data illustrated in column 190, output determinator 140 determines that a high state, i.e., 1, is the least common output value of potential PGC 182 (FIG. 4). The least common output value of potential PGC 182 (FIG. 4) is advantageous to know because if potential PGC 182 is to be power gated such that it may be powered down, the least common output value is what the output of potential PGC 182 should be fenced to.

In process P4C, input selector 142 selects the minimum set of inputs to potential PGC (FIG. 4) which are least switching and encompass the least common output value based on the functional simulating as the power gating logic expression. Again referring to FIG. 5, columns 192-200 illustrate output values for the different combinations of inputs A, B and C, i.e., different combinations of where A, B and C are active, powered up. In one embodiment, input selector 142 selects a value N less than a total number of inputs (here 3) to potential PGC (FIG. 4), and for each input subset (shown in columns 192-200) with size equal to the value N, formulates logic expressions using the input subset that encompasses the least common output value (here 1) and all possible input expressions that generate the least common output value. "Encompass" indicates that the least common output value (here 1) is a possibility using those inputs. Input selector 142 then selects the minimum set of inputs to potential PGC (FIG. 4) that are least switching and encompass the least common output value as the power gating logic expression. For the FIG. 5 example data, column 198 indicates that with inputs A and C inactive, powered down, potential PGC 182 (FIG. 4) switches the least amount of time, i.e., 45%. Thus, turning off power to inputs A and C to potential PGC 182, which is in itself based on a low switching node, results in potential PGC 182 switching the least, and hence having to be turned on the least.

In process P5, energy savings determinator 150 determines whether energy savings using the power gating logic expression meets a criteria. Process P5 may include energy calculator 152 calculating energy savings using the power gating logic expression for potential PGC 182 (FIG. 4), and comparing the energy savings to the criteria. Process P5 thus ensures that implementation of potential PGC 182 (FIG. 4) actually results in an acceptable level of energy savings to substantiate the changes to IC design 90 (FIG. 1). The criteria may be user defined. In one embodiment, where a plurality of potential PGCs 182 are determined, process P5 may further include, as shown in process P5A, energy calculator 152 calculating energy savings of each potential PGC, and, optionally, in process P5B, sorter 154 sorting the plurality of potential PGCs by energy savings prior to the determining whether energy savings meets the criteria.

In processes P6-P8, acceptor 160 accepts potential PGC 182 (FIG. 4) in response to meeting the criteria. That is, acceptor 160 implements potential PGC 182 (FIG. 4) in IC design 90 (FIG. 1), and configures IC design 90 such that the minimum set of inputs (A and C in our example) are powered off for power gating of the PGC. This process is repeated for each potential PGC 182 (FIG. 4) that meets the energy savings criteria. Processes P6-P8 may also include determining whether logic of accepted potential PGCs 182 are in conflict, in which case acceptor 160 resolves any conflicts between the accepted PGCs, i.e., makes modifications to prevent overlap.

The above described methodology provides a more systematic approach for power gating logic cones, and allows for more logic to be power gated. Consequently, more power savings can be achieved compared with prior art techniques since more logic is being power gated.

As discussed herein, various systems and components are described as "obtaining" data (e.g., IC design 90, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

While shown and described herein as a method and system for power gating logic cones, it is understood that the disclosure further provides various alternative embodiments. That is, the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc. In one embodiment, the disclosure can take the form of a computer program product accessible from a computer-usable or computer-readable medium providing program code for use by or in connection with a computer or any instruction execution system, which when executed, enables a computer infrastructure to power gating logic cones. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, such as memory 122, magnetic tape, a removable computer diskette, a random access memory (RAM), a read-only memory (ROM), a tape, a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processing unit 114 coupled directly or indirectly to memory elements through a system bus 118. The memory elements can include local memory, e.g., memory 112, employed during actual execution of the program code, bulk storage (e.g., memory system 122), and cache memories which provide temporary storage of at least some program code in order to reduce the number of times code must be retrieved from bulk storage during execution.

In another embodiment, the disclosure provides a method of generating a system for power gating logic cones. In this case, a computer infrastructure, such as computer infrastructure 102 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the disclosure.

In still another embodiment, the disclosure provides a business method that performs the process described herein on a subscription, advertising, and/or fee basis. That is, a service provider, such as an application service provide (ASP), could offer to power gating logic cones as described herein. In this case, the service provider can manage (e.g., create, maintain, support, etc.) a computer infrastructure, such as computer infrastructure 102 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The methods, systems and program product as described above are used in the fabrication and design of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method performed on a computer system, comprising:
using the computer system to perform the following:
synthesizing logic for an integrated circuit (IC) design;
identifying low switching nodes within the logic that switch from one state to another state less often than an amount specified by a user-defined low switching node threshold;
determining a potential power gating cone (PGC) based on the identified low switching nodes;
determining a power gating logic expression for the potential PGC that includes a minimum set of inputs to the potential PGC that are least switching, wherein the power gating logic expression determining includes:
functionally simulating the potential PGC;
determining a least common output value of the potential PGC based on the functional simulating; and
selecting the minimum set of inputs to the potential PGC that are least switching and encompasses the least common output value based on the functional simulating as the power gating logic expression, wherein the selecting includes:
selecting a value N less than a total number of inputs to the potential PGC;
for each input subset with size equal to the value N, formulating logic expressions using the input subset that encompasses the least common output value and all possible input expressions that generate the least common output value;
determining whether energy savings using the power gating logic expression meets a user-defined energy savings criteria that is representative of an acceptable level of energy savings to substantiate accepting the potential PGC; and
accepting the potential PGC in response to meeting the user-defined energy savings criteria.

2. The method of claim 1, wherein the potential PGC determining includes tracing a low switching node backward and including each logic gate having only one fanout in the potential PGC for that low switching node.

3. The method of claim 1, wherein the potential PGC determining includes determining a plurality of potential PGCs, and wherein the energy savings determining includes:
calculating energy savings of each potential PGC; and
sorting the plurality of potential PGCs by energy savings prior to the determining whether energy savings meets the user-defined energy savings criteria.

4. The method of claim 1, wherein the accepting includes turning power off to the minimum set of inputs.

5. The method of claim 1, wherein in response to a plurality of PGCs being accepted, the accepting includes resolving any conflict between accepted potential PGCs.

6. A system comprising:
means for synthesizing logic for an integrated circuit (IC) design;
means for identifying low switching nodes within the logic that switch from one state to another state less often than an amount specified by a user-defined low switching node threshold;
means for determining a potential power gating cone (PGC) based on the identified low switching nodes;
means for determining a power gating logic expression for the potential PGC that includes a minimum set of inputs to the potential PGC that are least switching, wherein the power gating logic expression determining means includes:
means for functionally simulating the potential PGC;
means for determining a least common output value of the potential PGC based on the functional simulating; and
means for selecting the minimum set of inputs to the potential PGC that are least switching and encompasses the least common output value based on the functional simulating as the power gating logic expression, wherein the selecting means:
selects a value N less than a total number of inputs to the potential PGC; and
for each input subset with size equal to the value N, formulates logic expressions using the input subset that encompasses the least common output value and all possible input expressions that generate the least common output value;
means for determining whether energy savings using the power gating logic expression meets a user-defined energy savings criteria that is representative of an acceptable level of energy savings to substantiate accepting the potential PGC; and
means for accepting the potential PGC in response to meeting the user-defined energy savings criteria.

7. The system of claim 6, wherein the potential PGC determining means traces a low switching node backward and includes each logic gate having only one fanout in the potential PGC for that low switching node.

8. The system of claim 6, wherein the potential PGC determining means determines a plurality of potential PGCs, and wherein the energy savings determining means includes:
means for calculating energy savings of each potential PGC; and
means for sorting the plurality of potential PGCs by energy savings prior to the determining whether energy savings meets the user-defined energy savings criteria.

9. The system of claim 6, wherein the accepting means turns power off to the minimum set of inputs.

10. The system of claim 6, wherein in response to a plurality of PGCs being accepted, the accepting means resolves any conflict between accepted potential PGCs.

11. A program product stored on a non-transitory computer-readable medium, which when executed by a computer system, powers gating logic cones, the program product comprising:
program code for synthesizing logic for an integrated circuit (IC) design;
program code for identifying low switching nodes within the logic that switch from one state to another state less often than an amount specified by a user-defined low switching node threshold;
program code for determining a potential power gating cone (PGC) based on the identified low switching nodes;
program code for determining a power gating logic expression for the potential PGC that includes a minimum set of inputs to the potential PGC that are least switching, wherein the power gating logic expression determining code includes:
program code for functionally simulating the potential PGC;
program code for determining a least common output value of the potential PGC based on the functional simulating; and
program code for selecting the minimum set of inputs to the potential PGC that are least switching and encompasses the least common output value based on the functional simulating as the power gating logic expression, wherein the selecting code includes:
program code for selecting a value N less than a total number of inputs to the potential PGC; and
program code for, for each input subset with size equal to the value N, formulating logic expressions using the input subset that encompasses the least common output value and all possible input expressions that generate the least common output value;
program code for determining whether energy savings using the power gating logic expression meets a user-defined energy savings criteria that is representative of an acceptable level of energy savings to substantiate accepting the potential PGC; and
program code for accepting the potential PGC in response to meeting the user-defined energy savings criteria.

12. The program product of claim 11, wherein the potential PGC determining code traces a low switching node backward and includes each logic gate having only one fanout in the potential PGC for that low switching node.

13. The program product of claim 11, wherein the potential PGC determining code determines a plurality of potential PGCs, and wherein the energy savings determining code includes:
program code for calculating energy savings of each potential PGC; and
program code for sorting the plurality of potential PGCs by energy savings prior to the determining whether energy savings meets the user-defined energy savings criteria.

14. The program product of claim 11, wherein the accepting code turns power off to the minimum set of inputs.

* * * * *